US011457572B2

(12) United States Patent
Battoe

(10) Patent No.: US 11,457,572 B2
(45) Date of Patent: Oct. 4, 2022

(54) FOLDING PLANT PROTECTION CAGE APPARATUS

(71) Applicant: Donald Battoe, Fairview Heights, IL (US)

(72) Inventor: Donald Battoe, Fairview Heights, IL (US)

( * ) Notice: Subject to any disclaimer, the term of this patent is extended or adjusted under 35 U.S.C. 154(b) by 219 days.

(21) Appl. No.: 17/008,012

(22) Filed: Aug. 31, 2020

(65) Prior Publication Data

US 2022/0061234 A1    Mar. 3, 2022

(51) Int. Cl.
*A01G 13/04* (2006.01)
*A01G 13/10* (2006.01)
*A01G 13/02* (2006.01)

(52) U.S. Cl.
CPC ............. *A01G 13/04* (2013.01); *A01G 13/10* (2013.01); *A01G 13/0243* (2013.01); *A01G 2013/046* (2013.01)

(58) Field of Classification Search
CPC .......... A01G 13/04–043; A01G 13/046; A01G 2013/046; A01G 13/0206; A01G 13/0231; A01G 2009/003; B65D 43/161; B65D 2251/1083
USPC .................................................. 47/20.1–32.6
See application file for complete search history.

(56) References Cited

U.S. PATENT DOCUMENTS

| 23,935 | A | * | 5/1859 | Mosher | A01G 13/04 |
| | | | | | 415/141 |
| 77,662 | A | * | 5/1868 | Scotton | A01G 13/0243 |
| | | | | | 47/32.4 |
| 311,116 | A | * | 1/1885 | Garrard | A01G 13/04 |
| | | | | | 47/31 |
| 592,640 | A | * | 10/1897 | Omer | A01G 13/0243 |
| | | | | | 47/30 |
| 605,698 | A | * | 6/1898 | Clark | A01G 9/12 |
| | | | | | 47/47 |
| 685,247 | A | * | 10/1901 | Borrman | E04H 17/063 |
| | | | | | 256/72 |
| 874,218 | A | * | 12/1907 | Lutz | A01G 13/04 |
| | | | | | 47/31 |
| 905,983 | A | * | 12/1908 | Brown | A01G 17/06 |
| | | | | | 256/33 |
| 1,161,379 | A | * | 11/1915 | Denker | A01G 13/04 |
| | | | | | 47/31 |

(Continued)

FOREIGN PATENT DOCUMENTS

| CA | 2226712 A1 * | 7/1999 | ............. B65F 1/141 |
| CA | 2668366 A1 * | 12/2010 | ............ B65F 1/0006 |

(Continued)

*Primary Examiner* — Peter M Poon
*Assistant Examiner* — Morgan T Jordan

(57) ABSTRACT

A folding plant protection cage apparatus for protecting plants from animals includes a set of three hinged side pairs each including a pair of panels comprising a left panel and a right panel each comprising a panel frame and a panel face extending from a top edge to a bottom edge and from an outer edge to an inner edge. A door frame is coupled to the panel face. An access door is hingingly coupled to the door frame. A plurality of inner hinges joins the inner edge of each of the left panel and the right panel. A plurality of outer hinge knuckles couples the outer edge of the panel frame of adjacent side pairs. A lid is hexagonal and selectively engageable with the top edge of each panel frame of set of hinged side pairs.

6 Claims, 8 Drawing Sheets

(56) References Cited

U.S. PATENT DOCUMENTS

| | | | | |
|---|---|---|---|---|
| 1,189,047 | A * | 6/1916 | Boyer | A01G 13/04 47/29.3 |
| 1,330,404 | A * | 2/1920 | Sommer | A01K 3/00 256/25 |
| 1,485,924 | A * | 3/1924 | Hobbs | A01G 13/04 47/30 |
| 1,616,290 | A * | 2/1927 | Walker | A01G 13/04 47/31 |
| 1,621,440 | A * | 3/1927 | Stoddard | A01G 13/04 47/61 |
| 1,635,071 | A * | 7/1927 | Comstock | A01G 17/04 47/47 |
| 2,009,867 | A * | 7/1935 | Ball | A01G 9/12 D25/100 |
| 2,264,290 | A * | 12/1941 | Blain | A01G 13/04 52/DIG. 17 |
| 2,651,502 | A * | 9/1953 | Carvelo | E04H 17/18 256/33 |
| 3,088,245 | A * | 5/1963 | Menge | A01G 9/12 47/47 |
| 3,438,146 | A * | 4/1969 | Nickerson | A01G 9/28 47/33 |
| 3,809,345 | A * | 5/1974 | Tebbe | A01G 5/04 248/27.8 |
| 4,005,548 | A * | 2/1977 | Nahon | A01G 9/12 182/180.1 |
| 4,211,033 | A * | 7/1980 | Ringer | A01G 9/12 220/4.16 |
| 4,858,380 | A | 8/1989 | Gayle | |
| 5,060,415 | A * | 10/1991 | Schleip | A01G 9/16 47/19.2 |
| 5,215,267 | A * | 6/1993 | Taylor | C05F 17/907 241/101.8 |
| 5,323,559 | A * | 6/1994 | Allman | A01G 17/06 52/646 |
| 5,412,905 | A | 5/1995 | Allison | |
| 5,448,867 | A * | 9/1995 | Wilson | A01G 9/16 52/643 |
| 5,509,229 | A | 4/1996 | Thomasson | |
| 5,544,446 | A * | 8/1996 | Benson, Jr. | A01G 9/12 220/6 |
| 5,555,681 | A * | 9/1996 | Cawthon | E04B 7/028 52/79.5 |
| 5,809,690 | A * | 9/1998 | Due | A01G 13/0243 47/30 |
| 5,862,628 | A | 1/1999 | Takashima | |
| 5,992,673 | A * | 11/1999 | Hwang | B65D 21/022 220/255 |
| 6,088,956 | A * | 7/2000 | Rocka | A01G 9/12 47/45 |
| 6,640,491 | B1 * | 11/2003 | Fox | A01G 13/04 47/23.3 |
| 6,796,083 | B2 | 9/2004 | Hadar | |
| 8,308,141 | B1 * | 11/2012 | Mellins | E04H 17/22 256/25 |
| D707,505 | S * | 6/2014 | Woodard | A01G 17/04 D8/1 |
| 10,015,934 | B2 * | 7/2018 | Harik | A01G 13/0243 |
| 10,327,436 | B2 * | 6/2019 | Bevacqua | A01G 13/10 |
| 2003/0029079 | A1 * | 2/2003 | Kleinert | A01G 13/10 47/32.4 |
| 2007/0028512 | A1 * | 2/2007 | McGhee | A01G 9/16 47/17 |
| 2008/0251526 | A1 * | 10/2008 | Fick | B65D 43/161 206/508 |
| 2009/0077881 | A1 * | 3/2009 | Singer | A01G 9/027 47/70 |
| 2010/0186292 | A1 * | 7/2010 | Hall | A01G 9/28 47/33 |
| 2011/0289833 | A1 * | 12/2011 | Lohse | A01G 13/0231 47/20.1 |
| 2012/0090230 | A1 * | 4/2012 | Frost | A01G 9/12 47/45 |
| 2013/0145686 | A1 * | 6/2013 | Dame | A01G 9/12 47/45 |
| 2013/0283682 | A1 * | 10/2013 | Patoskie | A01G 9/12 47/45 |
| 2014/0109474 | A1 * | 4/2014 | Reed, Jr. | A01G 9/12 211/207 |
| 2015/0223412 | A1 * | 8/2015 | Vanderwall-Arnold | A01G 9/12 47/45 |
| 2015/0272014 | A1 * | 10/2015 | Byler | A01G 9/16 47/17 |
| 2017/0181386 | A1 * | 6/2017 | Zusy | A01G 13/0243 |
| 2017/0238478 | A1 * | 8/2017 | Brough | A01G 13/10 |
| 2017/0354097 | A1 * | 12/2017 | Hadley | A01G 9/029 |
| 2021/0144933 | A1 * | 5/2021 | Gazenko | A01G 9/16 |
| 2022/0061233 | A1 * | 3/2022 | Peace | A01G 13/0212 |

FOREIGN PATENT DOCUMENTS

| | | | | |
|---|---|---|---|---|
| DE | 10007803 | A1 * | 8/2001 | A01G 13/04 |
| DE | 202013100818 | U1 * | 6/2013 | A01G 13/04 |
| EP | 3603381 | A1 * | 2/2020 | A01G 13/0243 |
| FR | 2569524 | A1 * | 3/1986 | A01G 13/0231 |
| FR | 2580898 | A1 * | 10/1986 | A01G 13/04 |
| FR | 2644032 | A * | 9/1990 | A01G 13/0231 |
| FR | 2738109 | A1 * | 3/1997 | A01G 13/0231 |
| FR | 2877542 | A1 * | 5/2006 | A01G 13/04 |
| GB | 713139 | A * | 7/1952 | |
| GB | 2037555 | A * | 7/1980 | A01G 13/04 |
| GB | 2483800 | A * | 3/2012 | A01G 9/02 |
| GB | 2535607 | A * | 8/2016 | A01G 13/04 |
| WO | WO-9728682 | A1 * | 8/1997 | A01G 9/00 |

* cited by examiner

FOLDING PLANT PROTECTION CAGE APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to gardening tool devices and more particularly pertains to a new gardening tool device for protecting plants from animals.

(2) Description of Related Art Including Information Disclosed Under 37 CFR 1.97 and 1.98

The prior art relates to gardening tool devices. Existing devices to protect plants from animals are typically flexible net that can be torn or is too malleable and allows the plants to be trampled. Other devices may be a rigid wire but then do not fold easily for storage and transportation. These devices also lack modularity for easy adaptation as the plants grow.

BRIEF SUMMARY OF THE INVENTION

An embodiment of the disclosure meets the needs presented above by generally comprising a set of three hinged side pairs. Each hinged side comprises a pair of panels comprising a left panel and a right panel. Each of the left panel and the right panel comprise a panel frame having a top edge, a bottom edge, an outer edge, and an inner edge. A panel face is coupled to the panel frame. The panel face extends from the top edge to the bottom edge and from the outer edge to the inner edge. The panel face is a semi-rigid wire mesh. A door frame is coupled to the panel face. An access door is hingingly coupled to the door frame. A plurality of inner hinges is coupled to the pair of panels. The plurality of inner hinges hingingly joins the inner edge of each of the left panel and the right panel. A plurality of outer hinge knuckles is coupled to the pair of panels. The plurality of outer hinge knuckles is coupled to the outer edge of each of the left panel and the right panel. Each of a set of three panel pins is selectively engageable with the plurality of outer hinge knuckles to hingingly couple the outer edge of the panel frame of adjacent side pairs. A lid is hexagonal and selectively engageable with the top edge of each panel frame of set of hinged side pairs.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
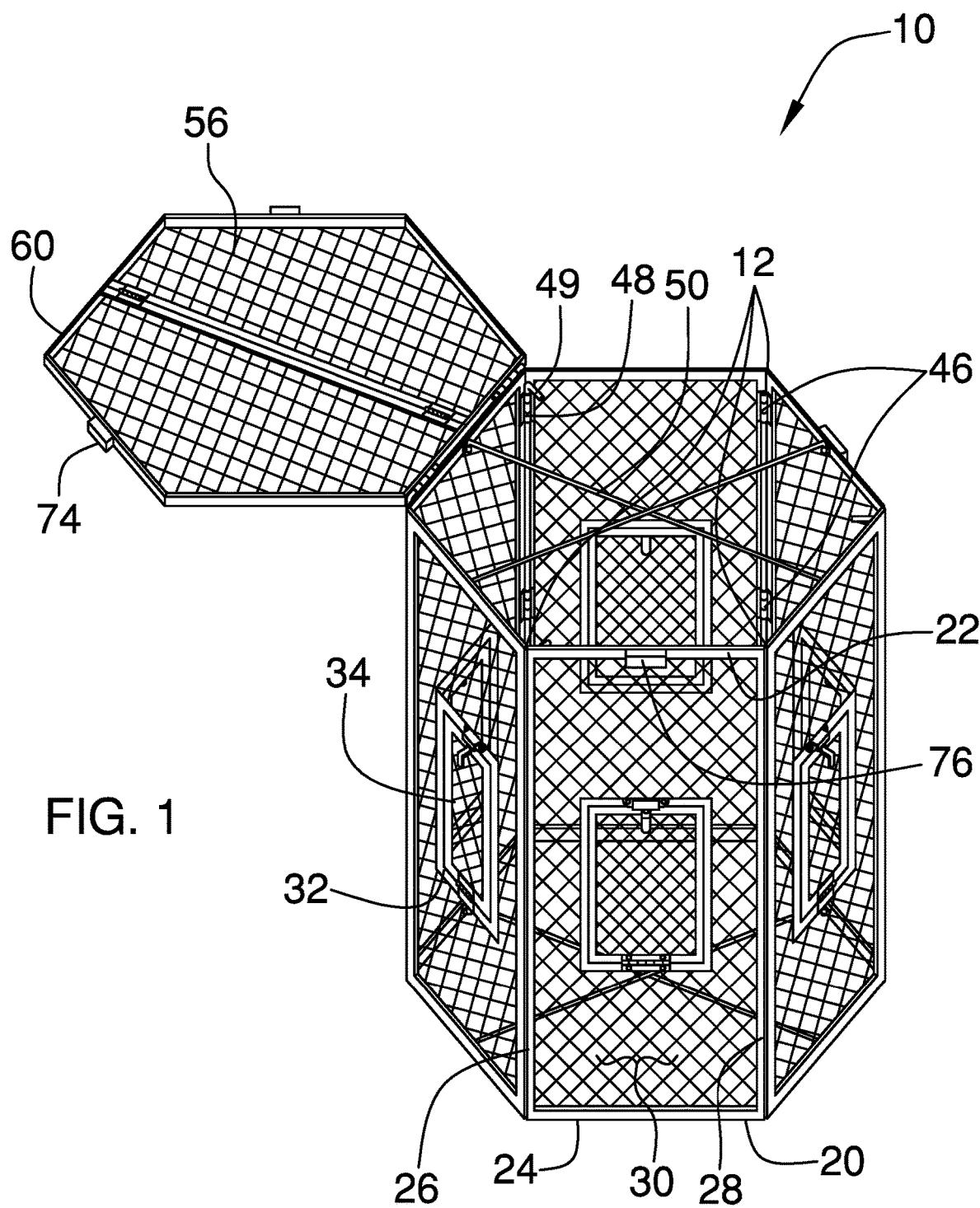
FIG. 1 is an isometric view of a folding plant protection cage apparatus according to an embodiment of the disclosure.
Figure 2:
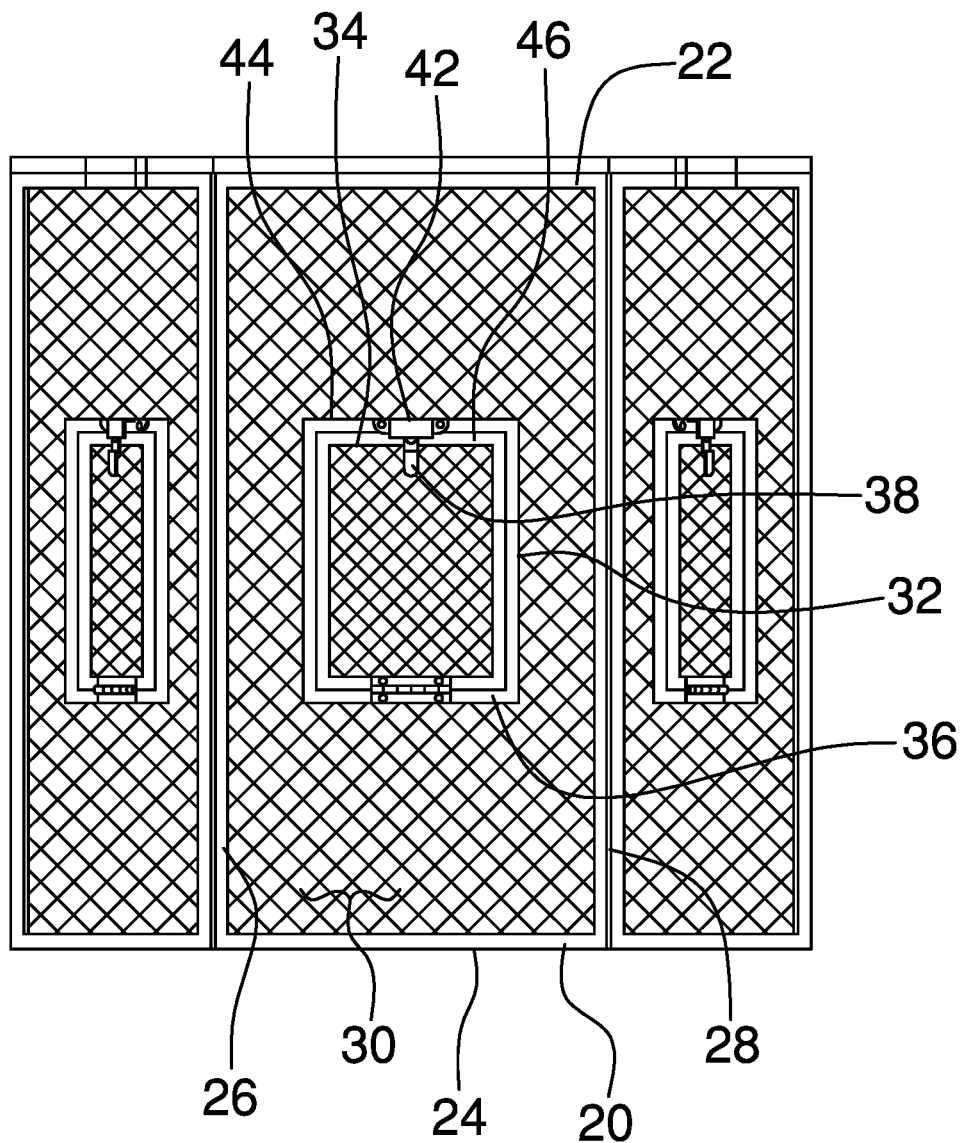
FIG. 2 is a side elevation view of an embodiment of the disclosure.
Figure 3:
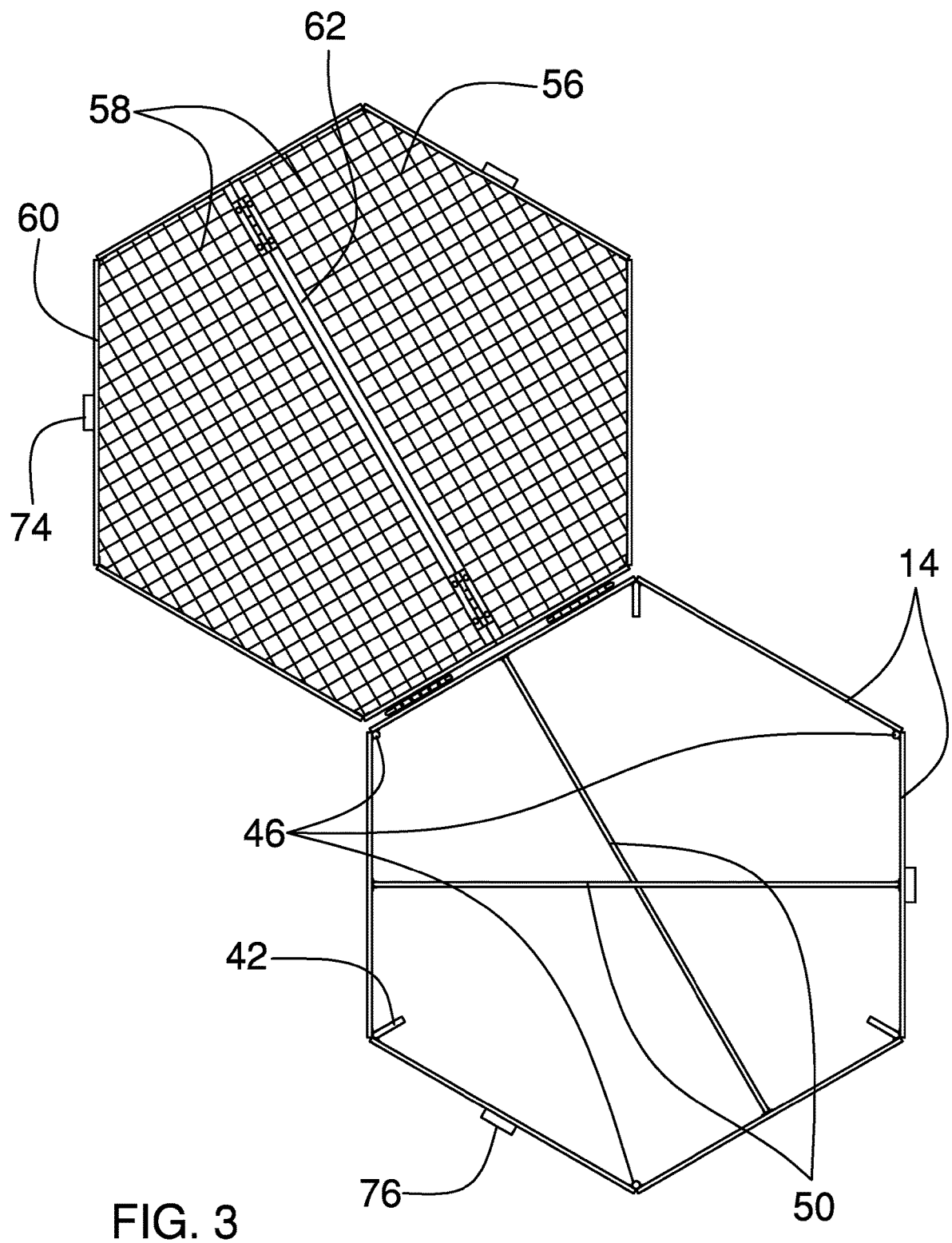
FIG. 3 is a top plan view of an embodiment of the disclosure.
Figure 4:
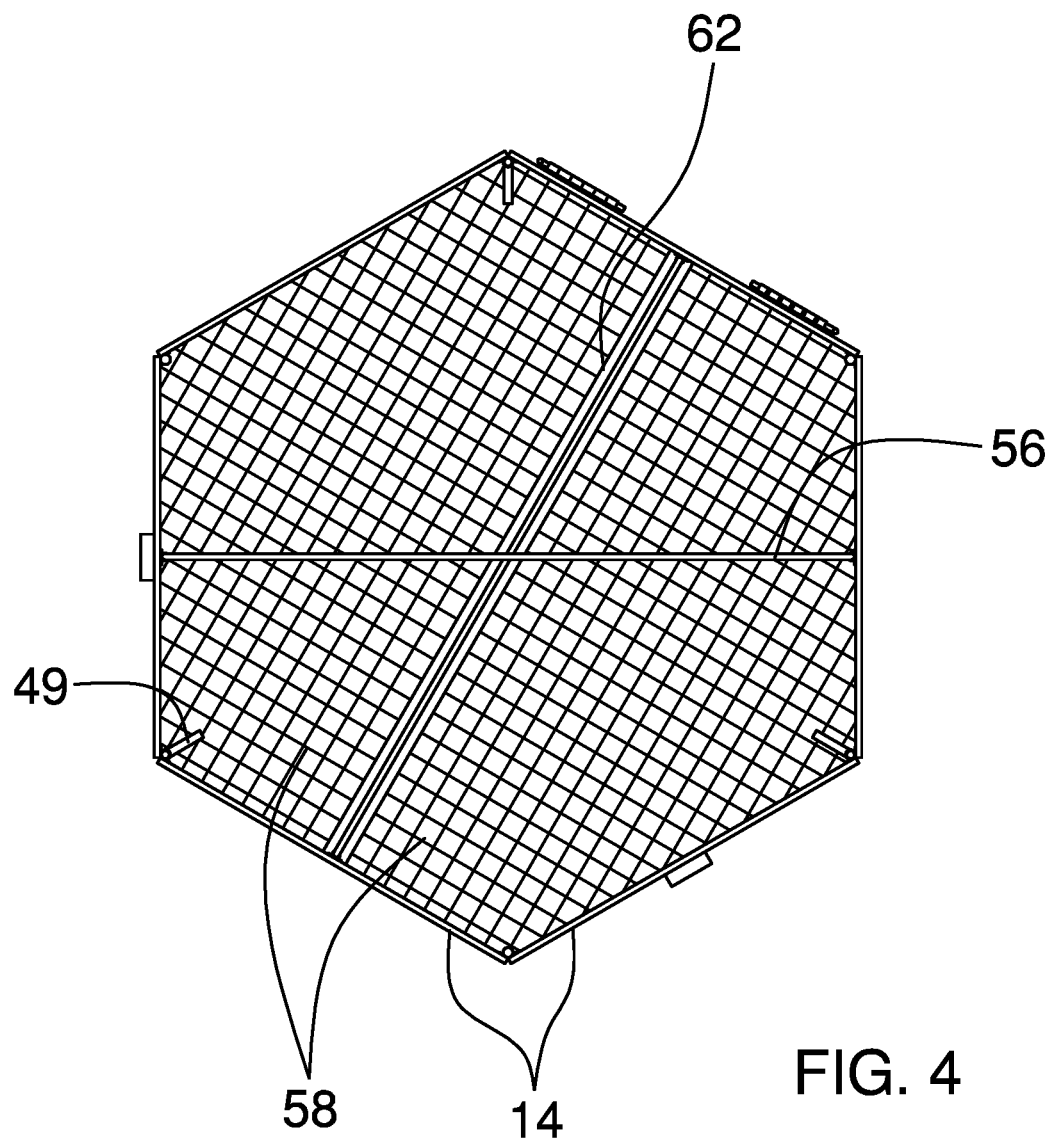
FIG. 4 is a bottom plan view of an embodiment of the disclosure.
Figure 5:
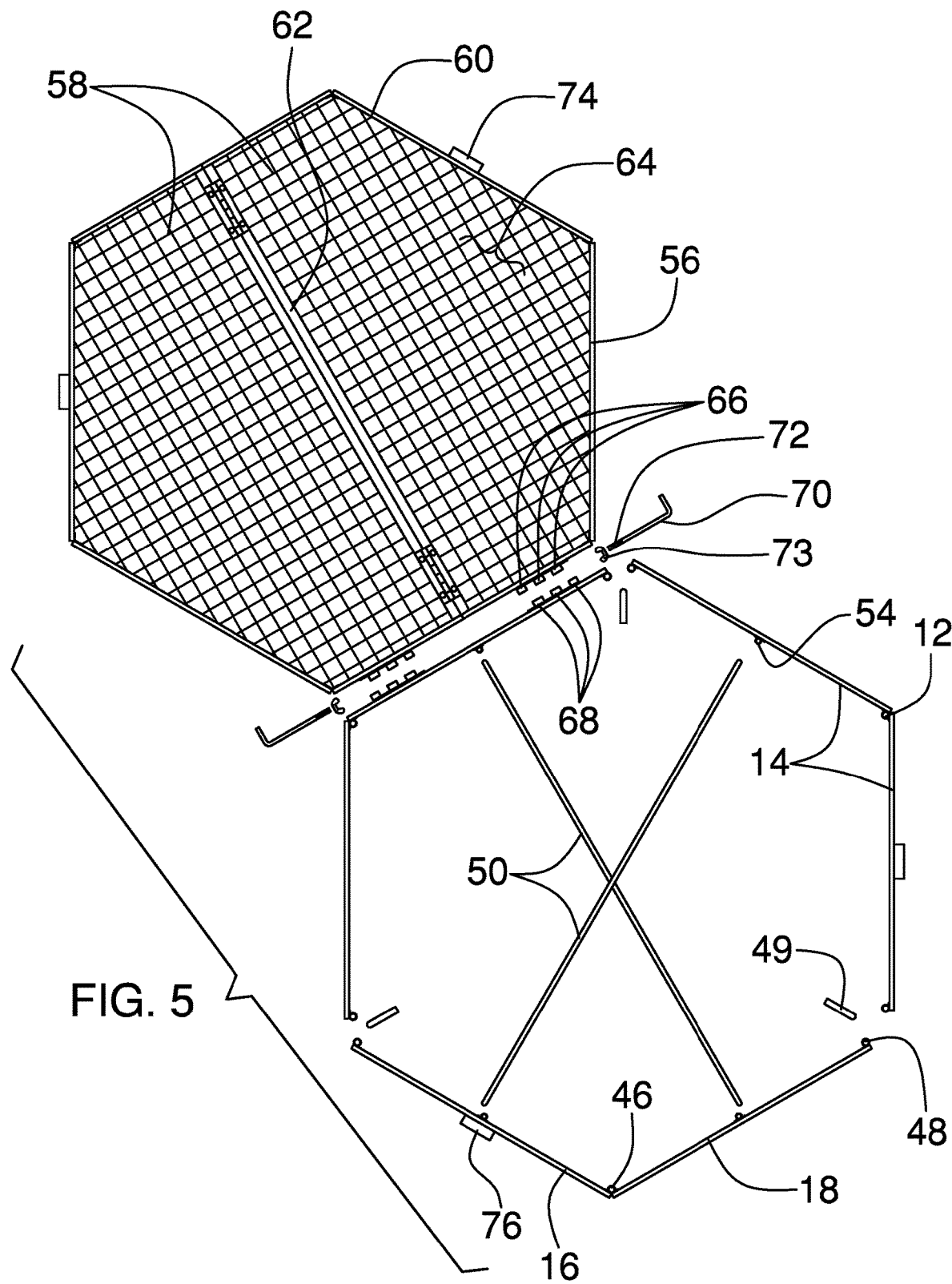
FIG. 5 is an exploded view of an embodiment of the disclosure.
Figure 6:
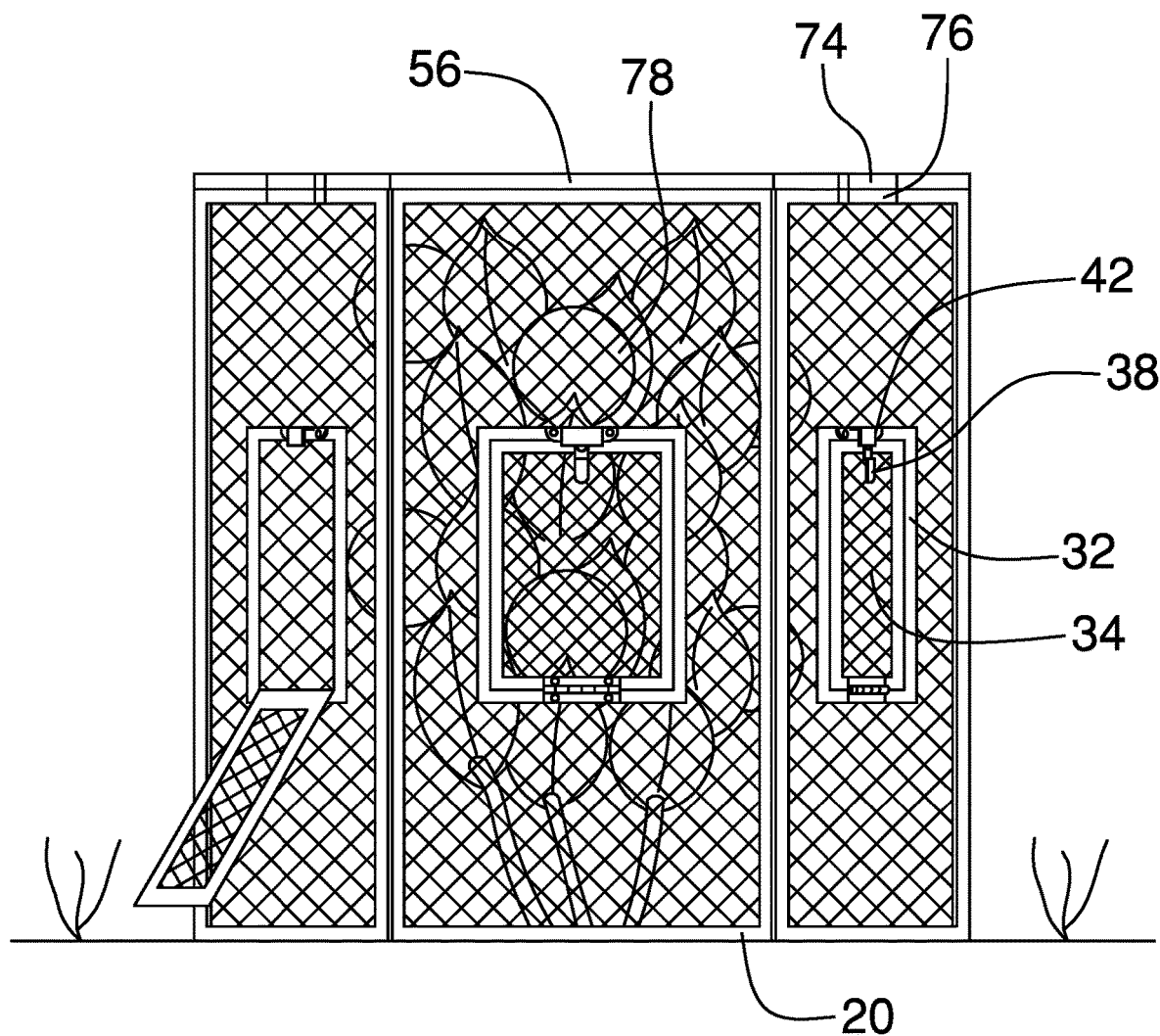
FIG. 6 is an in-use view of an embodiment of the disclosure.

With reference now to the drawings, and in particular to FIGS. 1 through 8 thereof, a new gardening tool device embodying the principles and concepts of an embodiment of the disclosure and generally designated by the reference numeral 10 will be described.

As best illustrated in FIGS. 1 through 8, the folding plant protection cage apparatus 10 generally comprises a set of three hinged side pairs 12 each comprising a pair of panels 14 comprising a left panel 16 and a right panel 18. Each of the left panel 16 and the right panel 18 comprise a panel frame 20 having a top edge 22, a bottom edge 24, an outer edge 26, and an inner edge 28. A panel face 30 is coupled to the panel frame 20. The panel face 30 extends from the top edge 22 to the bottom edge 24 and from the outer edge 26 to the inner edge 28. The panel face 30 may be a semi-rigid wire mesh that is impenetrable by animals yet allows sunlight and water to pass through. The width of each of the pair of panels 14 may be equal to half of the height of each of the pair of panels 14.

A door frame 32 is coupled to the panel face 30. An access door 34 is coupled to the door frame 32. The access door 34 is hingingly coupled to a door frame bottom 36 of the door frame. The height of the access door 34 may equal 25% of the height of each panel 14 and the width of the access door 34 may equal ⅔ of its height. A door latch 38 is coupled to the door frame 32. The door latch 38 is coupled to a door top 40 of the access door and is selectively engageable with a door latch receiver 42 coupled to a door frame top 44 of the door frame.

A plurality of inner hinges 46 is coupled to the pair of panels 14. The plurality of inner hinges 46 hingingly joins the inner edge 28 of each of the left panel 16 and the right panel 18. A plurality of outer hinge knuckles 48 is coupled to the pair of panels 14. The plurality of outer hinge knuckles 48 is coupled to the outer edge 26 of each of the left panel 16 and the right panel 18. Each of a set of three panel pins 49 is selectively engageable with the plurality of outer hinge knuckles 48 to hingingly couple the outer edge 26 of the panel frame of adjacent side pairs 12. Each panel pin 49 may have a bent top end 51 to easily be removed from the plurality of outer hinge knuckles 48.

Each of a plurality of support rods 50 has a pair of bent outer ends 52 to selectively engage a plurality of support rod receivers 54 coupled to the top edge 22 and the bottom edge 24 of the panel frame of each panel. When each of the hinged side pairs 12 has been joined with the panel pins 50 a hexagonal prism is formed. The plurality of support rods 50 extend perpendicularly between the panels 14 lying in parallel planes to add structural integrity to the apparatus 10.

A lid 56 is hexagonal and may comprise a pair of lid halves 58. Each lid half 58 comprises a pentagonal lid frame 60 with a medial edge 62 of the lid frame of the pair of lid halves being hingingly coupled together to allow the lid 56 to fold and fit into packaging that can accommodate one of the panels 14. A lid face 64 is coupled to the lid frame 60 and may be the semi-rigid wire mesh of the panel face 30.

A plurality of lid hinge knuckles 66 is coupled to the lid frame 60 on each of the lid halves 58. A plurality of top hinge knuckles 68 is coupled to the top edge 22 of the panel frame of one of the hinged side pairs. A pair of lid pins 70 is selectively engageable with the plurality of top hinge knuckles 66 and the plurality of lid hinge knuckles 88 to hingingly couple the lid 56 to the top edge 22 of one of the hinged side pairs. Each lid pin 70 may be L-shaped and may have a threaded distal end 72 to receive a wingnut 73. A pair of lid latches 74 may be coupled to the lid 56. The pair of lid latches 74 is selectively engageable with a pair of lid latch receivers 76 coupled to the top edge 22 of the panel frame of two of the panels 14.

Figure 7:
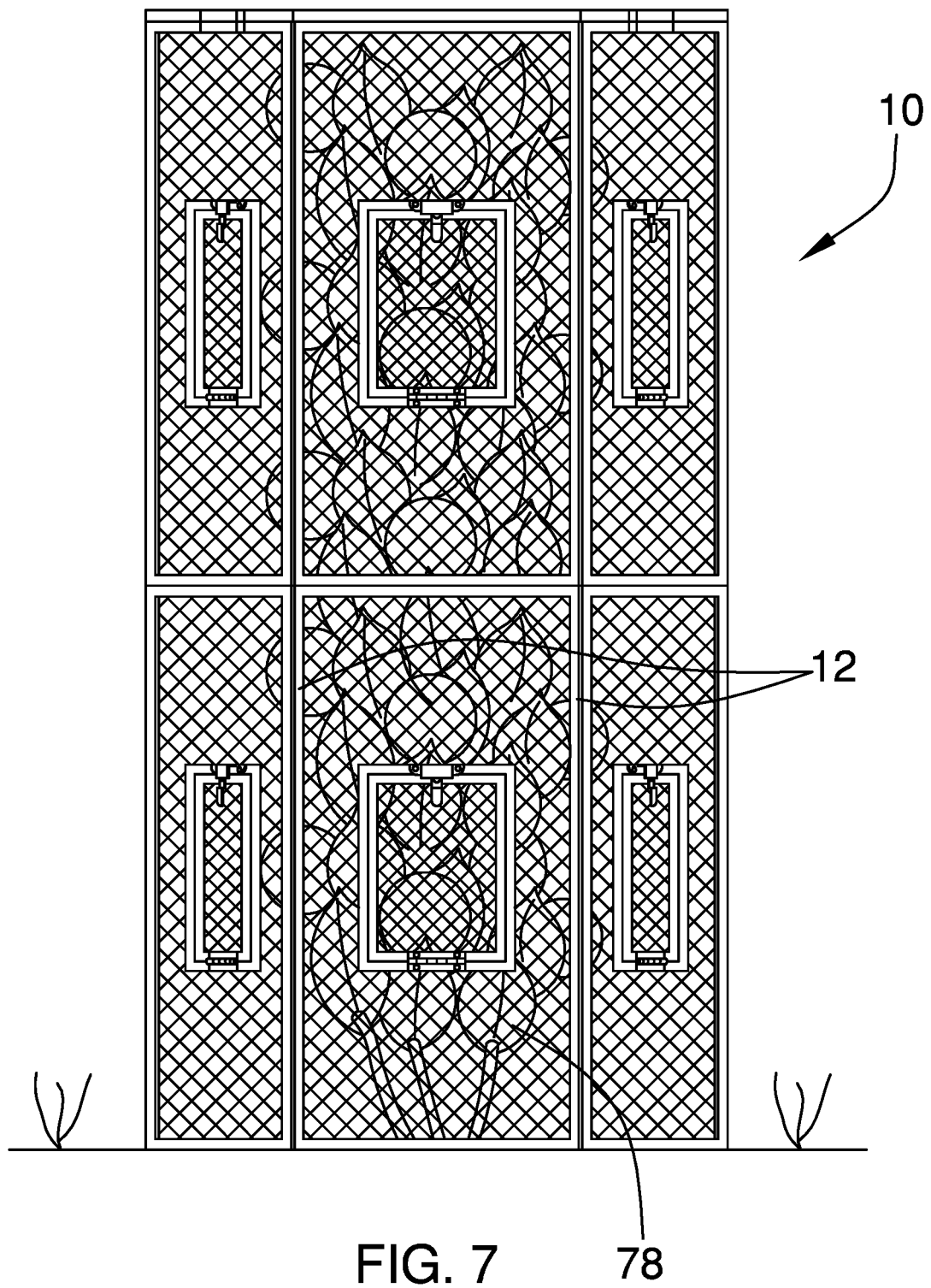
FIG. 7 is an in-use view of an embodiment of the disclosure.
Figure 8:
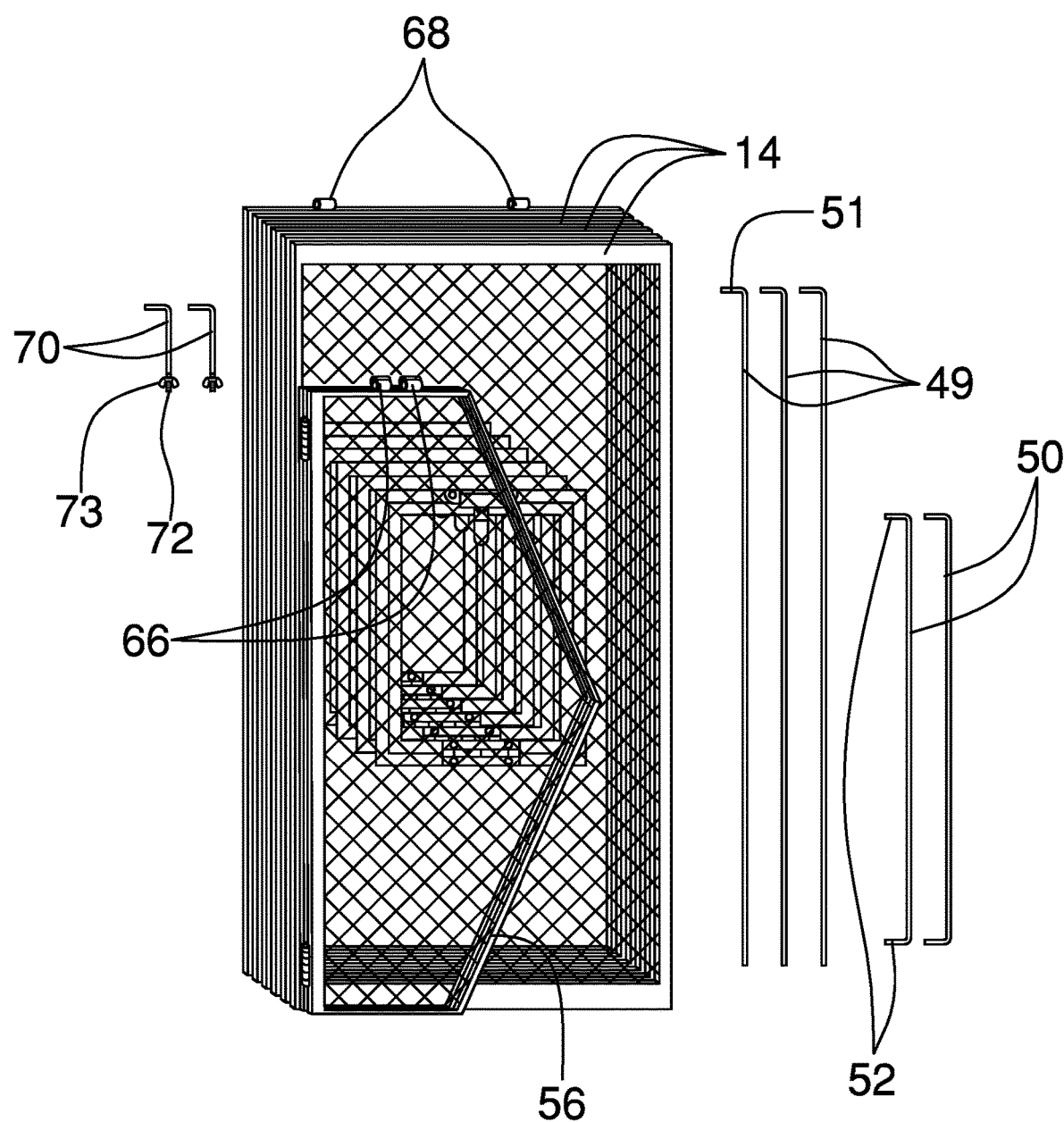
FIG. 8 is an isometric view of an embodiment of the disclosure.

In use, the hinged side pairs 12 are joined with the panel pins 49 and the support rods 50 are engaged with the support rod receivers 54. The lid 56 is then engaged with the top hinge knuckles 68 using the lid pins 70. The apparatus 10 is placed around a plant 78 to provide protection from animals while allowing for access to sunlight and water. The access doors 34 allow for easy tending to the plant 78 and removal of crops without moving the apparatus 10. As the plant 78 becomes too large for the apparatus 10, a second set of hinged side pairs 12 may be added beneath the first as seen in FIG. 7.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A folding plant protection cage apparatus comprising:
a set of three hinged side pairs, each hinged side pair comprising:
a pair of panels comprising a left panel and a right panel, each of the left panel and the right panel comprising:
a panel frame having a top edge, a bottom edge, an outer edge, and an inner edge;
a panel face coupled to the panel frame, the panel face extending from the top edge to the bottom edge and from the outer edge to the inner edge, the panel face being a semi-rigid wire mesh;
a door frame coupled to the panel face; and
an access door hingingly coupled to the door frame;
a plurality of inner hinges coupled to the pair of panels, the plurality of inner hinges hingingly joining the inner edge of each of the left panel and the right panel; and
a plurality of outer hinge knuckles coupled to the pair of panels, the plurality of outer hinge knuckles being coupled to the outer edge of each of the left panel and the right panel;
a set of three panel pins, each panel pin being selectively engageable with the plurality of outer hinge knuckles to hingingly couple the outer edge of the panel frame of adjacent side pairs; and
a lid, the lid being hexagonal and selectively engageable with the top edge of each panel frame of the set of three hinged side pairs, the lid comprising a pair of lid halves, each lid half comprising:
a pentagonal lid frame, a medial edge of the lid frame of the pair of lid halves being hingingly coupled together;
a lid face coupled to the lid frame, the lid face being the semi-rigid wire mesh;
a plurality of lid hinge knuckles coupled to the lid frame;
a plurality of top hinge knuckles coupled to the top edge of the panel frame of one of the hinged side pairs; and
a pair of lid pins, the pair of lid pins being selectively engageable with the plurality of top hinge knuckles and the plurality of lid hinge knuckles to hingingly couple the lid to the top edge of one of the hinged side pairs.

2. The folding plant protection cage apparatus of claim 1 further comprising each panel pin having a bent top end.

3. The folding plant protection cage apparatus of claim 1 further comprising a pair of lid latches coupled to the lid, the pair of lid latches being selectively engageable with a pair of lid latch receivers coupled to the top edge of the panel frame of two of the panels.

4. The folding plant protection cage apparatus of claim 1 further comprising the access door being hingingly coupled to a door frame bottom of the door frame.

5. The folding plant protection cage apparatus of claim 1 further comprising a door latch coupled to the door frame, the door latch being coupled to a door top of the access door and being selectively engageable with a door latch receiver coupled to a door frame top of the door frame.

6. A folding plant protection cage apparatus comprising:
a set of three hinged side pairs, each hinged side pair comprising:
  a pair of panels comprising a left panel and a right panel, each of the left panel and the right panel comprising:
    a panel frame having a top edge, a bottom edge, an outer edge, and an inner edge;
    a panel face coupled to the panel frame, the panel face extending from the top edge to the bottom edge and from the outer edge to the inner edge, the panel face being a semi-rigid wire mesh;
    a door frame coupled to the panel face;
    an access door coupled to the door frame, the access door being hingingly coupled to a door frame bottom of the door frame; and
    a door latch coupled to the door frame, the door latch being coupled to a door top of the access door and being selectively engageable with a door latch receiver coupled to a door frame top of the door frame;
  a plurality of inner hinges coupled to the pair of panels, the plurality of inner hinges hingingly joining the inner edge of each of the left panel and the right panel; and
  a plurality of outer hinge knuckles coupled to the pair of panels, the plurality of outer hinge knuckles being coupled to the outer edge of each of the left panel and the right panel;
a set of three panel pins, each panel pin being selectively engageable with the plurality of outer hinge knuckles to hingingly couple the outer edge of the panel frame of adjacent side pairs, each panel pin having a bent top end;
a lid, the lid being hexagonal, the lid comprising a pair of lid halves, each lid half comprising:
  a pentagonal lid frame, a medial edge of the lid frame of the pair of lid halves being hingingly coupled together;
  a lid face coupled to the lid frame, the lid face being the semi-rigid wire mesh; and
  a plurality of lid hinge knuckles coupled to the lid frame;
a plurality of top hinge knuckles coupled to the top edge of the panel frame of one of the hinged side pairs;
a pair of lid pins, the pair of lid pins being selectively engageable with the plurality of top hinge knuckles and the plurality of lid hinge knuckles to hingingly couple the lid to the top edge of one of the hinged side pairs; and
a pair of lid latches coupled to the lid, the pair of lid latches being selectively engageable with a pair of lid latch receivers coupled to the top edge of the panel frame of two of the panels.

* * * * *